US012675640B2

(12) United States Patent
Ko

(10) Patent No.: US 12,675,640 B2
(45) Date of Patent: Jul. 7, 2026

(54) METHOD AND SYSTEM FOR SEARCHING FOR MEDIA MESSAGE USING KEYWORD EXTRACTED FROM MEDIA FILE

(71) Applicant: LINE Plus Corporation, Seongnam-si (KR)

(72) Inventor: Wonseob Ko, Seongnam-si (KR)

(73) Assignee: LINE PLUS CORPORATION, Seongnam-si (KR)

( * ) Notice: Subject to any disclaimer, the term of this patent is extended or adjusted under 35 U.S.C. 154(b) by 823 days.

(21) Appl. No.: 17/953,772

(22) Filed: Sep. 27, 2022

(65) Prior Publication Data

US 2023/0100140 A1      Mar. 30, 2023

(30) Foreign Application Priority Data

Sep. 29, 2021      (KR) ......................... 10-2021-0128994

(51) Int. Cl.
*G06F 40/35*           (2020.01)
*G06F 40/279*          (2020.01)
(Continued)

(52) U.S. Cl.
CPC ............ *G06F 40/35* (2020.01); *G06F 40/279* (2020.01); *H04L 51/04* (2013.01); *H04L 51/42* (2022.05)

(58) Field of Classification Search
CPC ...... G06F 40/35; G06F 40/279; G06F 16/908; G06F 16/313; G06F 16/901;
(Continued)

(56) References Cited

U.S. PATENT DOCUMENTS 5,664,126 A   *   9/1997   Hirakawa ............... H04L 67/75
                                                      709/229
6,229,894 B1 *   5/2001   Van Oorschot ..... G06F 21/6209
                                                      709/229
(Continued)

FOREIGN PATENT DOCUMENTS

JP          2018-507480          3/2018
JP          2019-212290          12/2019
(Continued)

OTHER PUBLICATIONS

Office Action dated May 20, 2024, in Korean Application No. 10-2021-0128994.
(Continued)

*Primary Examiner* — Thuykhanh Le
(74) *Attorney, Agent, or Firm* — STAAS & HALSEY LLP

(57)                    ABSTRACT

Disclosed is a media message search method and system through a keyword extracted from a media file. The media message search method may include generating a specific session of an instant messaging service or participating in the specific session; analyzing a media message to be sent through the specific session or a media message received through the specific session; extracting a keyword of media included in the analyzed media message; storing the extracted keyword in a local database of the computer apparatus in association with an identifier of the analyzed media message; providing a search interface for an instant message sent and received through the specific session; retrieving an identifier from the local database based on a keyword input through the search interface having been stored in the local database in association with the identifier; and providing, for display, a media message having the retrieved identifier.

15 Claims, 9 Drawing Sheets

(51) Int. Cl.
    *H04L 51/04*         (2022.01)
    *H04L 51/42*         (2022.01)
(58) Field of Classification Search
    CPC . G06F 16/9032; G06F 16/9038; H04L 51/04;
                        H04L 51/42; G10L 25/54
    USPC ............................................................. 704/9
    See application file for complete search history.

(56)            References Cited

U.S. PATENT DOCUMENTS

| | | | |
|---|---|---|---|
| 6,978,292 | B1* | 12/2005 | Murakami .......... G06Q 10/107 |
| | | | 709/200 |
| 7,099,867 | B2* | 8/2006 | Okada .................. G06F 16/313 |
| | | | 707/E17.084 |
| 7,624,416 | B1* | 11/2009 | Vandermolen ..... H04N 7/17318 |
| | | | 725/115 |
| 7,890,136 | B1* | 2/2011 | Fujisaki .............. H04M 1/0266 |
| | | | 455/12.1 |
| 10,182,024 | B1* | 1/2019 | Chung ................... H04L 51/10 |
| 10,194,027 | B1* | 1/2019 | Daddi ............... H04M 3/42221 |
| 10,218,649 | B2* | 2/2019 | Joo ...................... H04L 51/02 |
| 10,905,249 | B1* | 2/2021 | Saghiri ................. A61G 7/018 |
| 11,328,265 | B1* | 5/2022 | Givoly .............. G06Q 10/1097 |
| 2005/0261962 | A1* | 11/2005 | Chuah .................. G06Q 30/02 |
| | | | 705/14.66 |
| 2006/0080130 | A1* | 4/2006 | Choksi ................ G06Q 30/016 |
| | | | 709/206 |
| 2007/0067277 | A1* | 3/2007 | Ahn ........................ G06F 16/14 |
| 2007/0244968 | A1* | 10/2007 | Andreasson ........ H04L 12/1822 |
| | | | 709/204 |
| 2007/0282908 | A1* | 12/2007 | Van der Meulen ... G06F 16/907 |
| 2007/0288559 | A1* | 12/2007 | Parsadayan ........... G06Q 30/02 |
| | | | 709/204 |
| 2008/0276315 | A1* | 11/2008 | Shuster .............. H04L 63/1425 |
| | | | 726/22 |
| 2008/0300856 | A1* | 12/2008 | Kirk .................... G06F 16/3329 |
| | | | 704/4 |
| 2009/0055185 | A1* | 2/2009 | Nakade .................. G10L 15/30 |
| | | | 704/E15.001 |
| 2009/0164449 | A1* | 6/2009 | Huang ................. G06F 16/951 |
| | | | 707/999.005 |
| 2009/0204817 | A1* | 8/2009 | Deana-Roga ......... H04L 9/0819 |
| | | | 707/999.2 |
| 2009/0327110 | A1* | 12/2009 | Chen ...................... G06Q 30/04 |
| | | | 705/34 |
| 2010/0075701 | A1* | 3/2010 | Shang .................... H04L 51/58 |
| | | | 455/466 |
| 2010/0076974 | A1* | 3/2010 | Takahashi .............. G06Q 30/06 |
| | | | 709/206 |
| 2011/0307496 | A1* | 12/2011 | Jones ..................... G06F 16/24 |
| | | | 707/769 |
| 2012/0158853 | A1* | 6/2012 | Baartman .......... H04L 12/1827 |
| | | | 709/206 |
| 2012/0209878 | A1* | 8/2012 | Park .................... G06F 3/04817 |
| | | | 707/E17.014 |
| 2013/0151236 | A1* | 6/2013 | Iofinov ............. G06F 16/24524 |
| | | | 704/9 |
| 2013/0198210 | A1* | 8/2013 | Lee ....................... G06F 16/583 |
| | | | 707/755 |
| 2013/0226943 | A1* | 8/2013 | Zheng .................... H04L 51/04 |
| | | | 707/755 |
| 2013/0238651 | A1* | 9/2013 | Benedek .............. G06F 16/248 |
| | | | 707/769 |
| 2014/0250145 | A1* | 9/2014 | Jones ..................... G06Q 10/40 |
| | | | 707/769 |
| 2014/0279336 | A1* | 9/2014 | Eid ...................... G06Q 10/107 |
| | | | 705/35 |
| 2015/0026267 | A1* | 1/2015 | Chakra ................ H04L 51/212 |
| | | | 709/206 |
| 2015/0026273 | A1* | 1/2015 | Yoon ...................... H04L 51/04 |
| | | | 709/206 |

| | | | |
|---|---|---|---|
| 2015/0350143 | A1* | 12/2015 | Yang ..................... G06F 3/0482 |
| | | | 345/173 |
| 2015/0371196 | A1* | 12/2015 | Lee ................... G06Q 10/1093 |
| | | | 705/7.19 |
| 2016/0021039 | A1* | 1/2016 | Woo ...................... H04L 51/226 |
| | | | 715/752 |
| 2016/0066165 | A1* | 3/2016 | Gmeiner ................. H04W 4/12 |
| | | | 455/412.1 |
| 2016/0104052 | A1* | 4/2016 | Kim ..................... G06V 30/413 |
| | | | 382/176 |
| 2016/0142352 | A1* | 5/2016 | Skudlark ............ H04L 63/1408 |
| | | | 709/206 |
| 2016/0366088 | A1* | 12/2016 | Abou Mahmoud .. H04L 51/214 |
| 2017/0118152 | A1* | 4/2017 | Lee ....................... G06F 16/345 |
| 2017/0346777 | A1* | 11/2017 | Kim ........................ H04L 51/04 |
| 2017/0346937 | A1* | 11/2017 | Adderly ........... H04M 1/72436 |
| 2018/0144235 | A1* | 5/2018 | Ground, Jr. ....... G06F 16/24522 |
| 2018/0205695 | A1* | 7/2018 | Tagawa ............. H04L 61/4594 |
| 2018/0224887 | A1* | 8/2018 | Pitigoi-Aron ..... H04L 12/40032 |
| 2018/0248829 | A1* | 8/2018 | Hardee ................. H04L 51/214 |
| 2018/0253659 | A1* | 9/2018 | Lee ......................... H04L 51/42 |
| 2018/0262717 | A1* | 9/2018 | Imaoka ................. G06F 3/0338 |
| 2018/0373737 | A1* | 12/2018 | Watanabe ............ G06F 16/532 |
| 2019/0213262 | A1* | 7/2019 | Xu .......................... G06F 9/451 |
| 2019/0303874 | A1* | 10/2019 | Yang .................. G06Q 10/107 |
| 2019/0386937 | A1* | 12/2019 | Kim ....................... G06N 3/044 |
| 2019/0386950 | A1* | 12/2019 | Chang .................... H04L 51/56 |
| 2020/0074014 | A1* | 3/2020 | Bakir ..................... G06F 18/24 |
| 2020/0195590 | A1* | 6/2020 | Lauer ..................... H04W 4/14 |
| 2020/0312326 | A1* | 10/2020 | Kudo ...................... G06F 3/167 |
| 2020/0349975 | A1* | 11/2020 | Krishnamurthy ...... G11B 27/34 |
| 2020/0356572 | A1* | 11/2020 | Peng .................. G06F 16/3334 |
| 2020/0364249 | A1* | 11/2020 | Sharma ............... H04M 1/2748 |
| 2020/0403955 | A1* | 12/2020 | Chen ................... H04L 67/306 |
| 2021/0004196 | A1* | 1/2021 | Arai ...................... G06F 3/1454 |
| 2021/0035561 | A1* | 2/2021 | D'Amato ............. A61N 1/3756 |
| 2021/0035572 | A1* | 2/2021 | D'Amato ............... G06F 3/167 |
| 2021/0058355 | A1* | 2/2021 | Dawes ................... H04L 51/42 |
| 2021/0090593 | A1* | 3/2021 | Ryu .................... G10L 25/18 |
| 2021/0181930 | A1* | 6/2021 | Gurule .............. G06F 3/04845 |
| 2021/0225365 | A1* | 7/2021 | Sinha ...................... H04R 3/04 |
| 2021/0233234 | A1* | 7/2021 | Van Oldenborgh ... G06Q 10/10 |
| 2021/0352207 | A1* | 11/2021 | Van Oldenborgh ... G06V 40/20 |
| 2021/0383106 | A1* | 12/2021 | Maggio ................ G06F 40/279 |
| 2021/0383127 | A1* | 12/2021 | Kikin-Gil ............. G06F 18/256 |
| 2022/0200937 | A1* | 6/2022 | Bar-on .................... H04L 51/02 |
| 2022/0263859 | A1* | 8/2022 | Liu ...................... H04L 63/1441 |
| 2022/0301072 | A1* | 9/2022 | Wang .................... G06N 3/0442 |
| 2022/0329555 | A1* | 10/2022 | Xu ....................... H04L 12/1827 |
| 2022/0353217 | A1* | 11/2022 | Madaan .............. H04M 7/0045 |
| 2022/0366372 | A1* | 11/2022 | Tomkow .............. G06Q 10/107 |
| 2022/0385602 | A1* | 12/2022 | Yoon .................... H04L 51/04 |
| 2023/0014319 | A1* | 1/2023 | Sharma ............... H04M 1/2748 |
| 2023/0021021 | A1* | 1/2023 | Park ........................ H04L 51/04 |
| 2023/0051244 | A1* | 2/2023 | Lee ........................ G06F 18/23 |
| 2023/0083047 | A1* | 3/2023 | Tang ..................... G06F 3/0484 |
| | | | 715/752 |
| 2023/0245651 | A1* | 8/2023 | Wang ..................... G06N 5/022 |
| | | | 704/275 |

FOREIGN PATENT DOCUMENTS

| | | |
|---|---|---|
| KR | 10-2010-0007228 | 1/2010 |
| KR | 10-1787248 | 10/2017 |
| KR | 10-2019-0143083 | 12/2019 |
| KR | 10-2020-0014108 | 2/2020 |
| KR | 10-2020-0047206 | 5/2020 |

OTHER PUBLICATIONS

Office Action dated issued on Mar. 3, 2026, Japanese Application No. 2022-152868.

* cited by examiner

METHOD AND SYSTEM FOR SEARCHING FOR MEDIA MESSAGE USING KEYWORD EXTRACTED FROM MEDIA FILE

CROSS-REFERENCE TO RELATED APPLICATION(S)

This U.S. non-provisional application claims the benefit of priority under 35 U.S.C. § 119 to Korean Patent Application No. 10-2021-0128994, filed Sep. 29, 2021, the entire contents of which are incorporated herein by reference in their entirety.

BACKGROUND

Technical Field

Some example embodiments relate to a media message search method and system through a keyword extracted from a media file.

Related Art

In an instant messaging service, a sequence of instant messages sent and received through a specific session may be displayed for participants that participate in a corresponding session through a chatroom corresponding to the corresponding session. Here, according to an increase in a number of instant messages, participants may have difficulty in retrieving a specific message previously sent and received in the chatroom.

To assist participants in retrieving a specific message, there is a function of retrieving a message that includes the specific keyword and displaying a position of the retrieved message in a sequence of instant messages in a chatroom.

Reference includes, for example, Korean Patent Laid-Open Publication No. 10-2010-0007228.

SUMMARY

Some example embodiments may provide a media message search method and system that may extract a keyword by analyzing media, such as photos, videos, and audios, included in messages sent and received through a specific session of an instant messaging service and may provide a text message and a media message in response to a keyword search of a user in a corresponding session by storing the extracted keyword of media as metadata of a message.

According to an aspect of at least one example embodiment, there is provided a media message search method of a computer apparatus including at least one processor, the media message search method including generating, by the at least one processor, a specific session of an instant messaging service or participating in the specific session; analyzing, by the at least one processor, a media message to be sent through the specific session or a media message received through the specific session; extracting a keyword of media included in the analyzed media message; storing, by the at least one processor, the extracted keyword in a local database of the computer apparatus in association with an identifier of the analyzed media message; providing, by the at least one processor, a search interface for an instant message sent and received through the specific session; retrieving an identifier from the local database based on a keyword input through the search interface having been stored in the local database in association with the identifier;

and providing, for display, by the at least one processor, a media message having the retrieved identifier.

The providing, for display, the media message may include displaying a search result list that includes a text message including the keyword input through the search interface and the media message having the retrieved identifier; and based on a search result selected from the search result list, displaying a sequence of instant messages sent and received through the specific session and that includes an instant message corresponding to the selected search result in chronological order in the sequence of instant messages.

The providing, for display, the media message may include displaying a sequence of instant messages sent and received through the specific session and that includes an instant message corresponding to the media message having the retrieved identifier.

The providing, for display, the media message may include displaying an instant message corresponding to the keyword input through the search interface in a sequence of instant messages sent and received through the specific session, and the instant message displayed may include a text message including the keyword input through the search interface and the media message having the retrieved identifier.

The analyzing may analyze the media message received through the specific session, and the media message received through the specific session may include a keyword, and the extracting of the keyword may include extracting the keyword from the received media message.

The extracting of the keyword may include, when the media includes an image, extracting a category of the image as the keyword, using a vision based-machine learning model that is trained to classify a category of an input image.

The extracting of the keyword may include, when the media includes audio, extracting a category of the audio as the keyword, using a sound analysis-based machine learning model that is trained to classify a category of input audio.

The extracting of the keyword may include, when the media includes a video, extracting a first category of thumbnail images of the video using a vision-based first machine learning model that is trained to classify a category of an input image; extracting a second category of audio of the video using a sound analysis-based second machine learning model that is trained to classify a category of input audio; and determining at least one of the first category and the second category as the keyword.

According to an aspect of at least one example embodiment, there is provided a non-transitory computer-readable recording medium storing instructions that, when executed by a processor, cause the processor to computer-implement the method.

According to an aspect of at least one example embodiment, there is provided a computer apparatus including at least one processor configured to execute computer-readable instructions to provide a process including receiving a media message and a keyword of media included in the media message extracted by a sender-side terminal of the media message through a specific session of an instant messaging service, storing the received keyword of media in association with the media message, delivering the received media message and keyword of the media to terminals of participants of the specific session, and registering the received keyword of media as a tag of timeline content related to the media.

According to some example embodiments, it is possible to extract a keyword by analyzing media, such as photos, videos, and audios, included in messages sent and received through a specific session of an instant messaging service and to provide a text message and a media message in response to a keyword search of a user in a corresponding session by storing the extracted keyword of media as metadata of a message.

Further areas of applicability will become apparent from the description provided herein. The description and specific examples in this summary are intended for purposes of illustration only and are not intended to limit the scope of the present disclosure.

DETAILED DESCRIPTION

Figure 1:
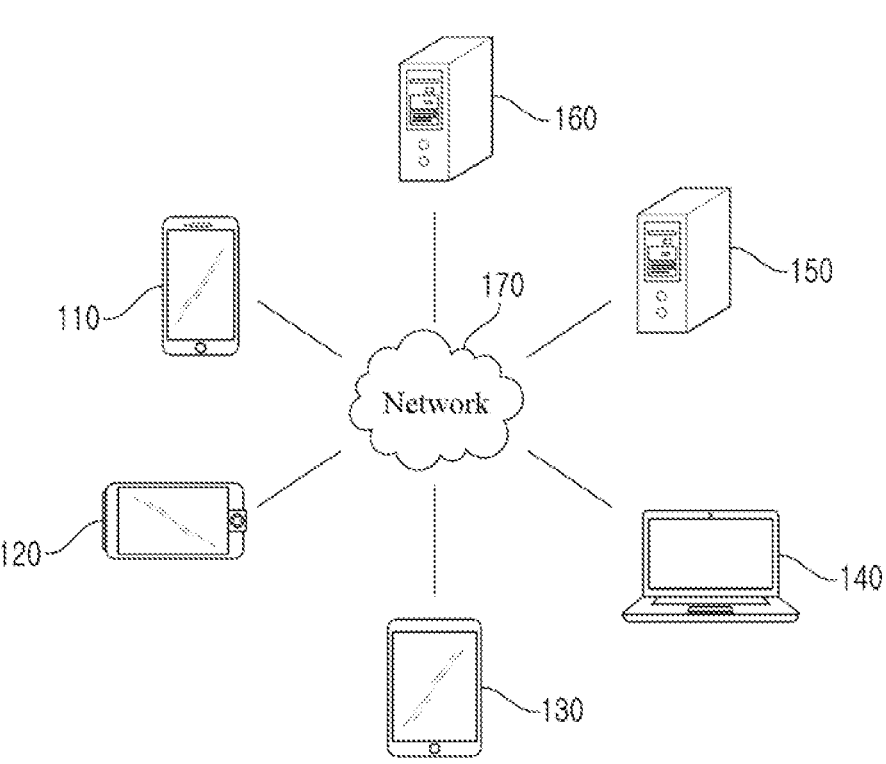
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, example embodiments will be described with reference to the accompanying drawings.

A media message search system according to example embodiments may be implemented by at least one computer apparatus. Here, a computer program according to an example embodiment may be installed and run on the computer apparatus. The computer apparatus may perform the media message search method according to example embodiments under control of the running computer program. The computer program may be stored in non-transitory computer-readable record medium to computer-implement the media message search method in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include an instant messaging service, a transaction (e.g., transfer) service, a payment service, a crypto-currency exchange, a risk monitoring service, a game service, a group call service (or a voice conference service), a messaging service, a mail service, a social network service, a map service, a translation service, a financial service, a search service, and/or a content providing service.

Figure 2:
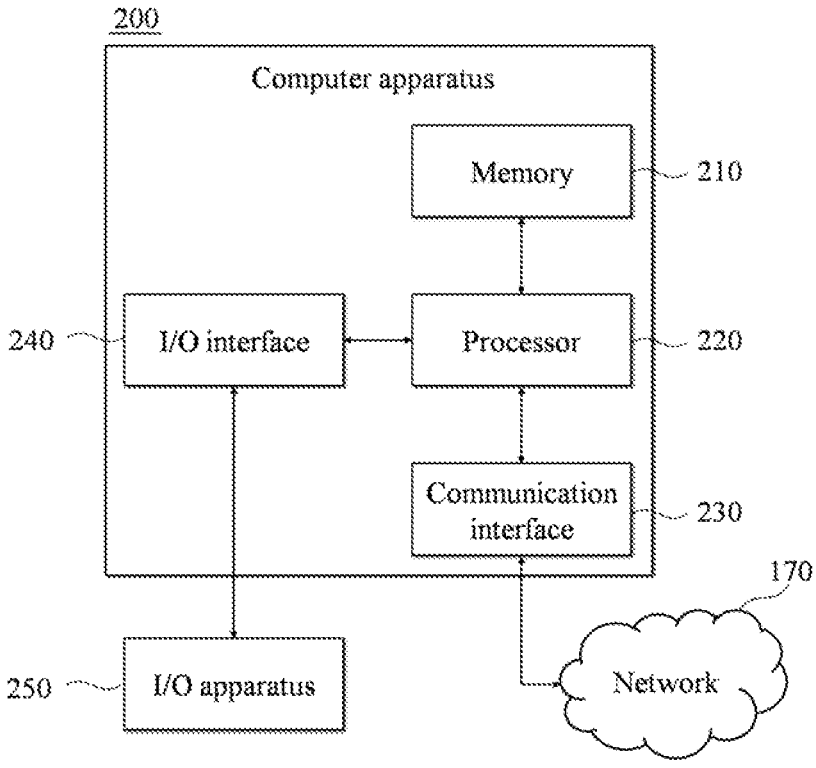
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. At least one of the I/O apparatus 250 may be configured as a single apparatus with the computer apparatus 200. For example, the I/O apparatus 250 may be configured in a form in which a touchscreen, a microphone, and a speaker, are included in the computer apparatus 200, such as a smart-phone.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB).

Figure 3:
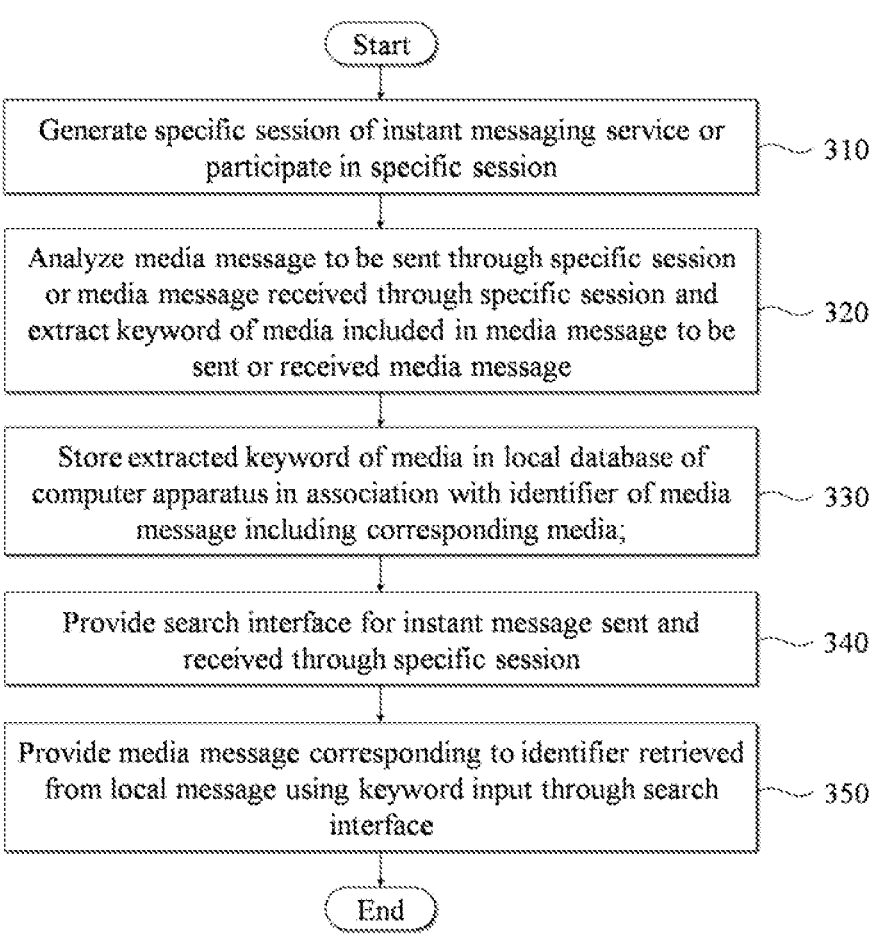
FIG. 3 is a flowchart illustrating an example of a media message search method according to at least one example embodiment.

FIG. 3 is a flowchart illustrating an example of a media message search method according to at least one example embodiment. The media message search method according to the present example embodiment may be performed by the computer apparatus 200 that implements a terminal configured to send or receive an instant message by participating in a specific session using an instant messaging service. Here, the processor 220 of the computer apparatus 200 may be configured to execute a control instruction according to a code of at least one computer program or a code of an OS included in the memory 210. Here, the processor 220 may control the computer apparatus 200 to perform operations 310 to 350 included in the method of FIG. 3 according to a control instruction provided from a code stored in the computer apparatus 200.

In operation 310, the computer apparatus 200 may generate a specific session of an instant messaging service or may participate in the specific session. A session of the instant messaging service may correspond to a specific chatroom. A sequence of instant messages sent and received through the corresponding session may be provided to participants of the corresponding session. For example, the at least one computer program may be an application related to the instant messaging service and the computer apparatus 200 may generate the specific session or participate in the specific session that is already generated through access to a server that provides the instant messaging service under control of the application by at least one processor (e.g., the processor 220).

In operation 320, the computer apparatus 200 may analyze a media message to be sent through the specific session or a media message received through the specific session and may extract a keyword of media included in the media message to be sent or the received media message. The computer apparatus 200 may send the instant message through the corresponding session of the instant messaging service or may receive an instant message of another participant. Here, an instant message including only text may be classified into a text message and an instant message including media such as an image, audio, and/or video may be classified into a media message. When the media desires to send the included media message, the computer apparatus 200 may extract a keyword of the media message to be sent by analyzing the media message before sending the media message. As another example, in the case of receiving the media message that includes the media, the computer apparatus 200 may also extract a keyword of the media included in the received media message. A method of extracting the keyword of the media is further described.

Meanwhile, in an example embodiment, the computer apparatus 200 may extract a keyword of media by directly analyzing the media included in the received media message. In another example embodiment, the computer apparatus 200 may simply receive the keyword extracted by a sender-side terminal of the media message. For example, the sender-side terminal may analyze the media message that the sender-side terminal desires to send and may extract the keyword of media included in the media message. Then, the sender-side terminal may send the extracted keyword of the media with the media message. The sent media message may be delivered to the computer apparatus 200 through a server that provides the instant messaging service. The computer apparatus 200 may extract a keyword included in the received media message as the keyword of the media included in the corresponding media message. Here, the server that delivers the media message may store instant messages sent and received in the server during a desired period of time. In this case, when storing the media message, the server may store the keyword of the media delivered with the corresponding media message in association with the corresponding media message. Keywords of media delivered to and stored in the server may be automatically registered as a tag of timeline content related to the corresponding media.

In operation 330, the computer apparatus 200 may store the extracted keyword of media in a local database of the computer apparatus 200 in association with an identifier of the media message that includes the corresponding media. Such a keyword of media may be used to search for a media message that includes specific media as metadata of media. Here, the local database may be implemented as the memory 210 of the computer apparatus 200 or the separately described permanent storage device.

In operation 340, the computer apparatus 200 may provide a search interface for an instant message sent and received through the specific session. The search interface may include a user interface for receiving a keyword from a user and, depending on example embodiment, may include a user interface for receiving a selection on, such as a keyword or a category, from the user.

In operation 350, the computer apparatus 200 may provide a media message corresponding to an identifier retrieved from the local message using a keyword input through the search interface.

In an example embodiment, the computer apparatus 200 may provide a media message corresponding to a retrieved identifier such that a portion corresponding to a position of the media message corresponding to the identifier retrieved from a sequence of instant messages sent and received through the specific session may be displayed. For example, the computer apparatus 200 may sequentially provide an instant message corresponding to the keyword input through the search interface in the sequence of instant messages sent and received in the corresponding session. As described above, the instant message may include a text message and a media message. In this case, the computer apparatus 200 may sequentially provide a text message that includes a specific keyword and/or a media message of the identifier stored in the local device in association with the specific keyword according to a sequence of instant messages. Here, providing an instant message may include displaying a position of the corresponding instant message in a chatroom in the corresponding sequence.

In another example embodiment, the computer apparatus 200 may initially display a list of search results corresponding to an input keyword on a screen. The list of search results may include at least one search result and, here, each search result may include information on a corresponding instant message. For example, in the case of the text message, the search result may include an identifier of a sender of the text message, a profile image of the sender, and at least a portion of a corresponding text. As another example, in the case of the media message, the search result may include an identifier of a sender, a profile image of the sender, and information on a type (an image (photo), audio, a video, etc.) of media included in the media message. In this case, when a specific search result is selected by the user (e.g., when a touch input is recognized by the user in an area which an icon 520 is displayed in a touchscreen environment), the computer apparatus 200 may provide an instant message corresponding to a corresponding search result to the user by displaying a portion corresponding to a position of an instant message corresponding to the selected search result.

Therefore, the computer apparatus 200 may search for a media message as well as a text message corresponding to a keyword input through the search interface from the user from among instant messages sent and received through the specific session and may provide the text message and the media message.

Also, the computer apparatus 200 may use a machine learning model to extract a keyword from media included in the media message.

For example, when the media includes an image, the computer apparatus 200 may extract a category of the image as a keyword of media that includes the image, using a vision based-machine learning model that is trained to classify a category of an input image.

As another example, when the media includes audio, the computer apparatus 200 may extract a category of the audio as a keyword of media that includes the audio using a sound analysis-based machine learning model that is trained to classify a category of an input audio.

As another example, the media may include a video. Here, the video may include a plurality of thumbnail images and audio. In this case, the computer apparatus 200 may extract a first category of thumbnail images of the video using a vision-based first machine learning model that is trained to classify a category of an input image and may extract a second category of audio of the video using a sound analysis-based second machine learning model that is trained to classify a category of input audio. Then, the computer apparatus 200 may determine at least one of the first category and the second category as a keyword of the media that includes the video. Here, the first category may include a plurality of categories related to a plurality of thumbnail images. For example, the computer apparatus 200 may finally determine a large number of identical categories among the plurality of categories included in the first category as the first category. The computer apparatus 200 may determine one of or both of the first category and the second category as a keyword of media. As described above, the keyword of media may include at least one keyword.

A plurality of keywords may be extracted for a single image. For example, in the case of "Labrador Retriever", "Labrador" and "Retriever" may be extracted as keywords for a single image. As described above, the keyword of media may include the plurality of keywords. In this case, the media message that includes the corresponding media may be retrieved for one of the plurality of keywords.

Also, each machine learning model may be trained to output a category having at least a preset reliability for an input image or audio. This machine learning model may use at least one of various algorithms, for example, a multi-layer perceptron (MLP), a deep neural network (DNN), a convolutional neural network (CNN), a recurrent neural network (RNN), a group convolutional neural network (G-CNN), and a recurrent convolutional neural network (R-CNN), and is not limited to a specific algorithm. Also, each machine learning model may use one of known models implemented to classify an image or audio and to output a category. For example, to classify an image, known core machine learning (CoreML) framework and vision frame may be used. If a classification reliability is 70% or more, an identifier of classification may be regarded as a keyword. Also, known SoundAnalysis framework may be used for audio classification. Similar to the image classification, if the classification reliability is 70% or more, an identifier of classification may be regarded as a keyword.

Figure 4:
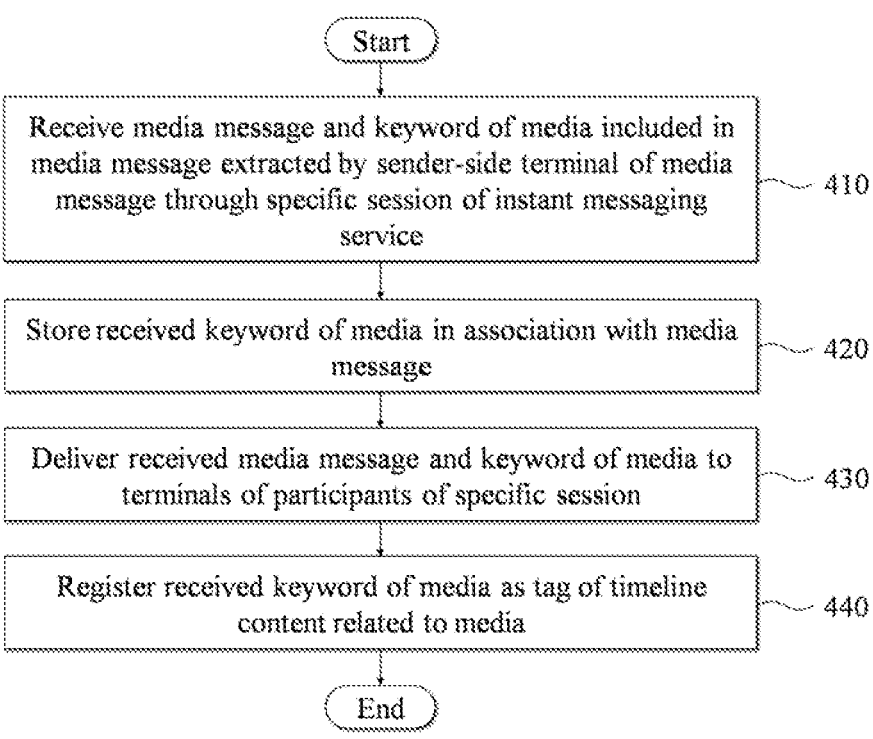
FIG. 4 is a flowchart illustrating another example of a media message search method according to at least one example embodiment.

FIG. 4 is a flowchart illustrating another example of a media message search method according to at least one example embodiment. The media message search method according to the example embodiment may be implemented by the computer apparatus 200 that implements a server configured to provide an instant messaging service. Here, the processor 220 of the computer apparatus 200 may be implemented to execute a control instruction according to a code of at least one computer program or a code of an OS included in the memory 210. Here, the processor 220 may control the computer apparatus 200 to perform operations 410 to 440 included in the method of FIG. 4 in response to a control instruction provided from a code stored in the computer apparatus 200.

In operation 410, the computer apparatus 200 may receive a media message and a keyword of media included in the media message extracted by a sender-side terminal of the media message through a specific session of an instant messaging service. Here, the keyword extracted by the sender-side terminal may be the keyword of media extracted for the media message to be sent in operation 320 of FIG. 3. When sending the media message, the sender-side terminal may extract a keyword of media included in the media message and then send the extracted keyword of media to the server with the media message.

In operation 420, the computer apparatus 200 may store the received keyword of media in association with the media message. For example, the computer apparatus 200 may store the received keyword of media in a local database of the computer apparatus 200 in association with an identifier of the received media message. Here, the local database may be implemented through the memory 210 of the computer apparatus 200 or the separately described permanent storage device.

In operation 430, the computer apparatus 200 may deliver the received media message and the keyword of media to terminals of participants of the specific session. Through this, a single media message may be retrieved by all of the sender-side terminal and a receiver-side terminal of the corresponding media message.

In operation 440, the computer apparatus 200 may register the received keyword of media as a tag of timeline content related to the media. The server may provide a timeline service for each member of the instant messaging service. Here, when media included in a specific media message is registered to the timeline service as timeline content, the server may automatically register and use the keyword of media extracted from the corresponding media message as the tag of timeline content.

FIGS. 5 to 9 illustrate examples of providing a search interface according to at least one example embodiment.

Figure 5:
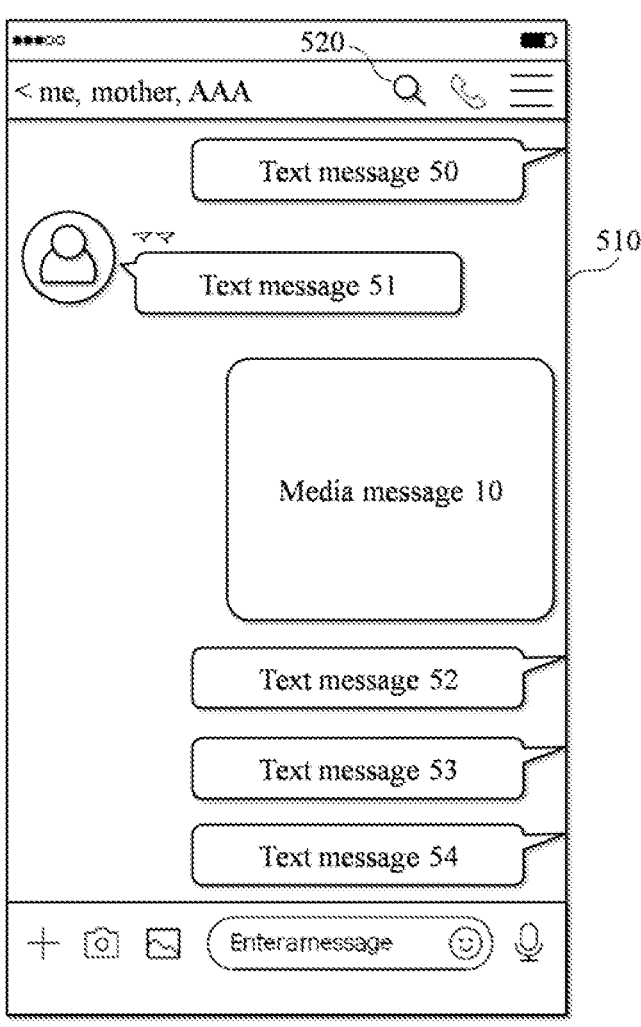
FIGS. 5 to 9 illustrate examples of providing a search interface according to at least one example embodiment.

The example embodiment of FIG. 5 represents an example of a chatroom screen 510 on which at least a portion of a sequence of instant messages sent and received through a specific session of an instant messaging service is displayed. The chatroom screen 510 may include various user interfaces as well as at least a portion of the sequence of instant messages. Here, the icon 520 for activating a search interface may be displayed on the chatroom screen 510 according to the example embodiment. In response to a selection on the icon 520 from the user (e.g., in response to a touch input from the user on an area on which the icon 520 is displayed in a touchscreen environment), the search interface may be activated.

Figure 6:
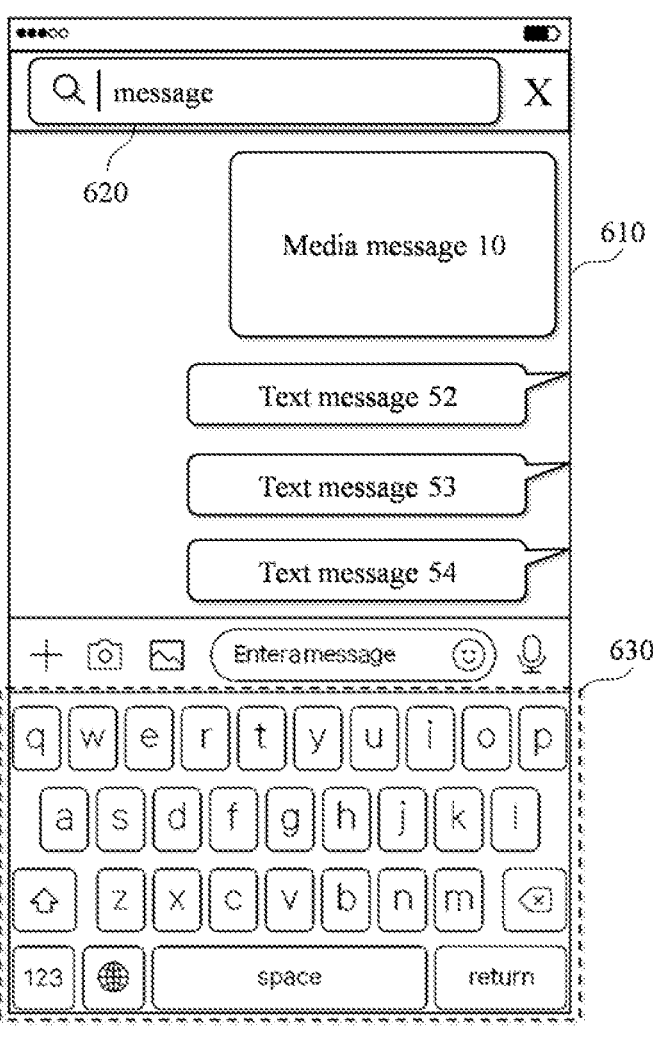

The example embodiment of FIG. 6 represents an example of a chatroom screen 610 in which a search interface is activated. The chatroom screen 610 represents an example in which an input box interface 620 for displaying a keyword input through the search interface and a keyboard interface for receiving a keyword such as a first box 630 indicated with dotted lines are displayed.

Figure 7:
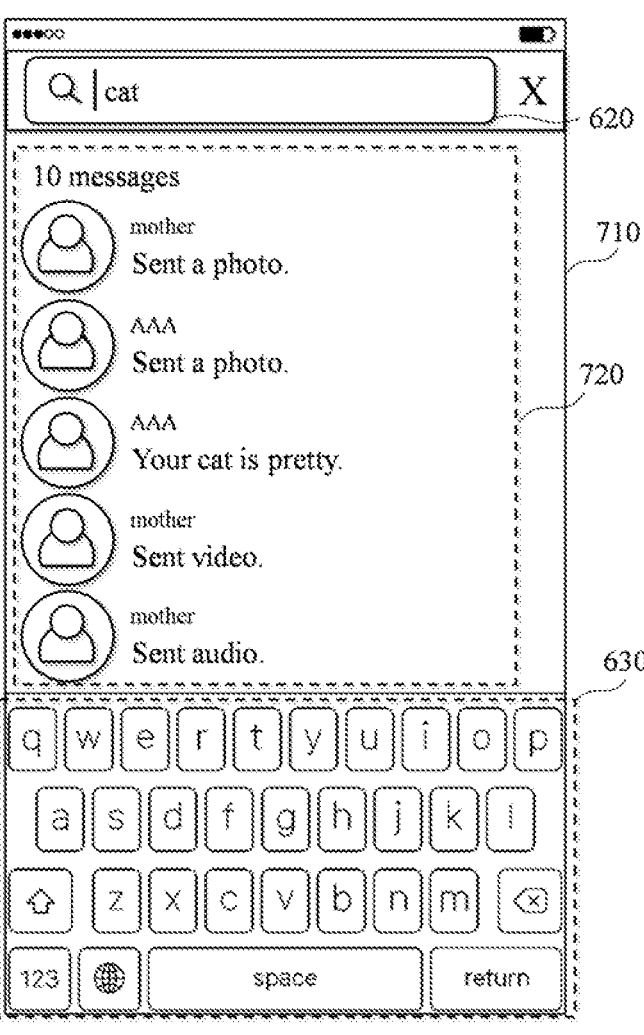

The example embodiment of FIG. 7 represents an example of a chatroom screen 710 on which, in response to a keyword input through the keyboard interface, the keyword input to the input box interface 620 is displayed and a list of search results corresponding to the input keyword is displayed. Here, a second box 720 indicated with dotted lines represents a portion of the list of search results displayed on the chatroom screen 710. Meanwhile, the user may select a single search result from among the displayed search results and may access an instant message corresponding to the selected search result. As shown in the chatroom screen 710, the search results may include a media message that includes a photo, a video, and/or audio as well as a text message. It can be easily understood that media messages in the example embodiments of FIG. 7 are media messages of which identifiers are stored in a local database of a terminal of a participant of a corresponding session in association with an input keyword "cat". That is, in response to an input of the keyword "cat" from the user, the terminal of the user may retrieve the local database for media messages through an identifier stored in association with the keyword "cat". Also, the terminal of the user may retrieve text messages that include the keyword "cat". The retrieved media messages and text messages may be sorted in a sequence of instant messages sent and received through a corresponding session and a search result list may be generated.

Figure 8:
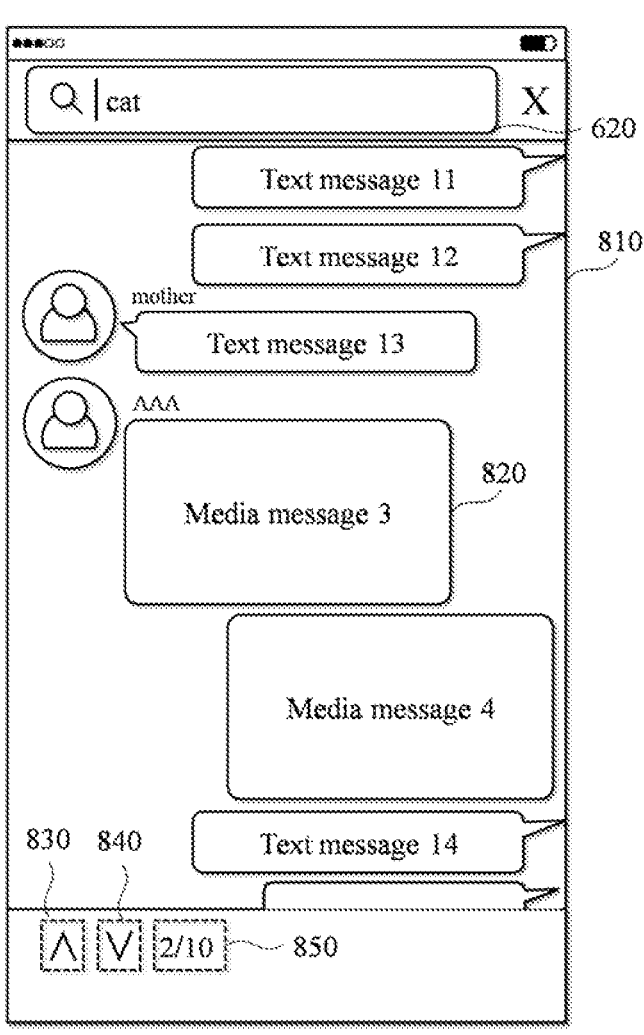

The example embodiment of FIG. 8 may represent an example of a chatroom screen 810 on which, in response to a selection on a second search result from the user on the chatroom screen 710, an instant message corresponding to the second search result is provided. Here, a portion corresponding to a position of a media message 3 820 in a sequence of instant messages sent and received through the corresponding session is displayed on the chatroom screen 810. For example, instant message 3 820 may be displayed in chronological order in the sequence of instant messages. Also, in the example embodiment of FIG. 8, a third box 830 indicated with dotted lines represents a first user interface for displaying a previous search result and a fourth box 840 indicated with dotted lines represents a second user interface for displaying a subsequent search result. Also, in the example embodiment of FIG. 8, a fifth box 850 indicated with dotted lines represents that a current displayed search result is a second search result among a total of 10 search results.

Figure 9:
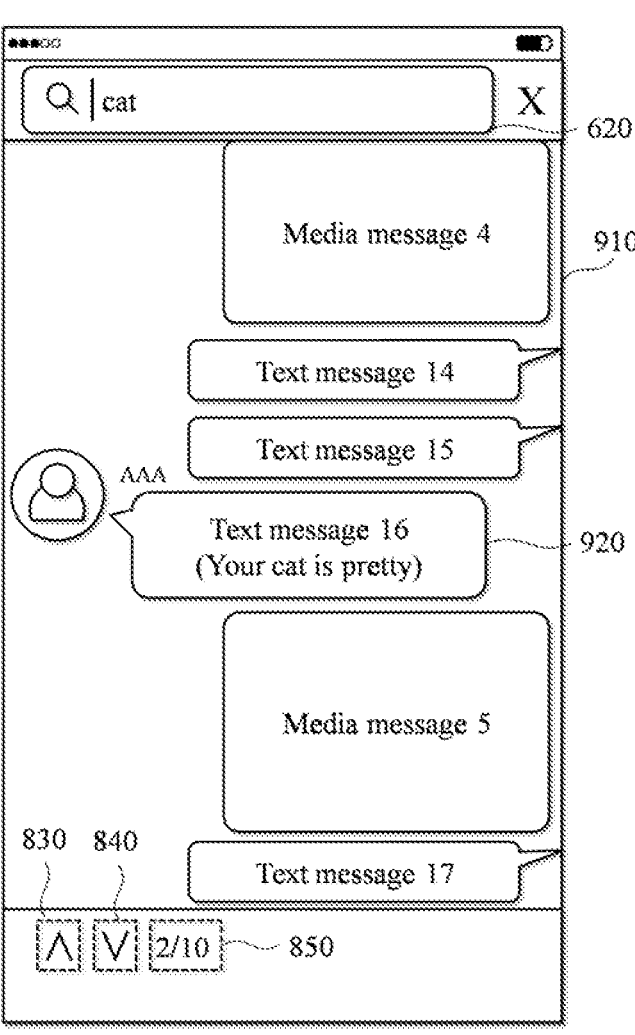

The example embodiment of FIG. 9 represents an example of a chatroom screen 910 for displaying a subsequent search result in response to a selection on the second user interface displayed through the fourth box 840 from the user on the chatroom screen 810. As described above with the example embodiment of FIG. 7, the subsequent search result may correspond to a text message (a text message 16 920) that includes a text "your cat is pretty" and the terminal of the user may display a portion corresponding to a position of the corresponding text message (the text message 16 920) in a sequence of instant messages sent and received through the corresponding session on the chatroom screen 910.

According to some example embodiments, it is possible to extract a keyword by analyzing media, such as photos, videos, and audios, included in messages sent and received through a specific session of an instant messaging service and to provide a text message and a media message in response to a keyword search of a user in a corresponding session by storing the extracted keyword of media as metadata of a message.

The systems or the apparatuses described above may be implemented using hardware components, software components, and/or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may include, alone or in combination with program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A non-transitory computer-readable recording medium storing instructions that, when executed by a processor, cause the processor to computer-implement a media message search method in conjunction with a computer apparatus, the media message search method comprising:

generating a specific session of an instant messaging service or participating in the specific session;

analyzing a media message to be sent through the specific session or a media message received through the specific session;

extracting a keyword of media included in the analyzed media message;

storing the extracted keyword in a local database of the computer apparatus in association with an identifier of the analyzed media message that identifies the analyzed media message from any other media message sent through or received through the specific session;

providing a search interface for an instant message sent and received through the specific session;

retrieving an identifier from the local database based on a keyword input through the search interface having been stored in the local database in association with the identifier; and providing, for display, a media message having the retrieved identifier, wherein the extracting of the keyword comprises:

when the media includes a video, extracting a first category of thumbnail images of the video using a vision-based first machine learning model that is trained to classify a category of an input image, extracting a second category of audio of the video using a sound analysis-based second machine learning model that is trained to classify a category of input audio, and determining at least one of the first category and the second category as the keyword.

2. The non-transitory computer-readable recording medium of claim 1, wherein the providing, for display, the media message comprises:

displaying a search result list that includes a text message including the keyword input through the search interface and the media message having the retrieved identifier, and based on a search result selected from the search result list, displaying a sequence of instant messages sent and received through the specific session and that includes an instant message corresponding to the selected search result in chronological order in the sequence of instant messages.

3. The non-transitory computer-readable recording medium of claim 1, wherein the providing, for display, the media message comprises:

displaying a sequence of instant messages sent and received through the specific session and that includes an instant message corresponding to the media message having the retrieved identifier.

4. The non-transitory computer-readable recording medium of claim 1, wherein the providing, for display, the media message comprises:

displaying an instant message corresponding to the keyword input through the search interface in a sequence of instant messages sent and received through the specific session, and the instant message displayed includes a text message including the keyword input through the search interface and the media message having the retrieved identifier.

5. The non-transitory computer-readable recording medium of claim 1, wherein the analyzing analyzes the media message received through the specific session, and the media message received through the specific session includes a keyword, and the extracting of the keyword comprises:

extracting the keyword from the received media message.

6. The non-transitory computer-readable recording medium of claim 1, wherein the extracting of the keyword comprises:

when the media includes an image, extracting a category of the image as the keyword, using a vision based-machine learning model that is trained to classify a category of an input image.

7. The non-transitory computer-readable recording medium of claim 1, wherein the extracting of the keyword comprises:

when the media includes audio, extracting a category of the audio as the keyword, using a sound analysis-based machine learning model that is trained to classify a category of input audio.

8. A media message search method of a computer apparatus comprising at least one processor, the media message search method comprising:

generating, by the at least one processor, a specific session of an instant messaging service or participating in the specific session;

analyzing, by the at least one processor, a media message to be sent through the specific session or a media message received through the specific session;

extracting a keyword of media included in the analyzed media message;

storing, by the at least one processor, the extracted keyword in a local database of the computer apparatus in association with an identifier of the analyzed media message that identifies the analyzed media message from any other media message sent through or received through the specific session;

providing, by the at least one processor, a search interface for an instant message sent and received through the specific session;

retrieving an identifier from the local database based on a keyword input through the search interface having been stored in the local database in association with the identifier; and providing, for display, by the at least one processor, a media message having the retrieved identifier, wherein the extracting of the keyword comprises:

when the media includes a video, extracting a first category of thumbnail images of the video using a vision-based first machine learning model that is trained to classify a category of an input image, extracting a second category of audio of the video using a sound analysis-based second machine learning model that is trained to classify a category of input audio, and determining at least one of the first category and the second category as the keyword.

9. The media message search method of claim 8, wherein the providing, for display, the media message comprises:

displaying a search result list that includes a text message including the keyword input through the search interface and the media message having the retrieved identifier and based on a search result selected from the search result list, displaying a sequence of instant messages sent and received through the specific session and that includes an instant message corresponding to the selected search result in chronological order in the sequence of instant messages.

10. The media message search method of claim 8, wherein the providing, for display, the media message comprises:

displaying a sequence of instant messages sent and received through the specific session and that includes an instant message corresponding to the media message having the retrieved identifier.

11. The media message search method of claim 8, wherein the providing, for display, the media message comprises:

displaying an instant message corresponding to the keyword input through the search interface in a sequence of instant messages sent and received through the specific session, and the instant message displayed includes a text message including the keyword input through the search interface and the media message having the retrieved identifier.

12. The media message search method of claim 8, wherein the analyzing analyzes the media message received through the specific session, and the media message received through the specific session includes a keyword, and the extracting of the keyword comprises:

extracting the keyword from the received media message.

13. The media message search method of claim 8, wherein the extracting of the keyword comprises:

when the media includes an image, extracting a category of the image as the keyword, using a vision based-machine learning model that is trained to classify a category of an input image.

14. The media message search method of claim 8, wherein the extracting of the keyword comprises:

when the media includes audio, extracting a category of the audio as the keyword, using a sound analysis-based machine learning model that is trained to classify a category of input audio.

15. A non-transitory computer-readable recording medium storing instructions that, when executed by a processor, cause the processor to computer-implement a media message search method in conjunction with a computer apparatus, the media message search method comprising:

generating a specific session of an instant messaging service or participating in the specific session;

analyzing a media message to be sent through the specific session or a media message received through the specific session;

extracting a keyword of media included in the analyzed media message;

storing the extracted keyword in a local database of the computer apparatus in association with an identifier of the analyzed media message;

providing a search interface for an instant message sent and received through the specific session;

retrieving an identifier from the local database based on a keyword input through the search interface having been stored in the local database in association with the identifier; and providing, for display, a media message having the retrieved identifier, wherein the extracting of the keyword comprises:

when the media includes a video, extracting a first category of thumbnail images of the video using a vision-based first machine learning model that is trained to classify a category of an input image, extracting a second category of audio of the video using a sound analysis-based second machine learning model that is trained to classify a category of input audio, and determining at least one of the first category and the second category as the keyword.

* * * * *